(12) United States Patent
Vashisth et al.

(10) Patent No.: US 6,759,979 B2
(45) Date of Patent: Jul. 6, 2004

(54) GPS-ENHANCED SYSTEM AND METHOD FOR AUTOMATICALLY CAPTURING AND CO-REGISTERING VIRTUAL MODELS OF A SITE

(75) Inventors: Robert M. Vashisth, Salt Lake City, UT (US); James U. Jensen, Salt Lake City, UT (US); James W. Bunger, Salt Lake City, UT (US)

(73) Assignee: E-BusinessControls Corp., Salt Lake City, UT (US)

( * ) Notice: Subject to any disclaimer, the term of this patent is extended or adjusted under 35 U.S.C. 154(b) by 0 days.

(21) Appl. No.: 10/348,275

(22) Filed: Jan. 21, 2003

(65) Prior Publication Data
US 2003/0137449 A1 Jul. 24, 2003

Related U.S. Application Data
(60) Provisional application No. 60/350,860, filed on Jan. 22, 2002.

(51) Int. Cl.[7] ............... G01S 5/14; G06T 15/00; G09G 5/00; H04N 5/225
(52) U.S. Cl. .......... 342/357.13; 345/419; 345/629; 348/218.1
(58) Field of Search ............... 342/357.06, 357.13, 342/357.14; 348/218.1; 345/419, 629

(56) References Cited

U.S. PATENT DOCUMENTS

| | | | | |
|---|---|---|---|---|
| 5,337,149 | A | * 8/1994 | Kozah et al. | 356/601 |
| 5,988,862 | A | 11/1999 | Kacyra et al. | 364/578 |
| 6,166,744 | A | 12/2000 | Jaszlics et al. | 345/435 |
| 6,246,468 | B1 | 6/2001 | Dimsdale | 356/4.02 |
| 6,249,600 | B1 | 6/2001 | Reed et al. | 382/154 |
| 6,292,215 | B1 | * 9/2001 | Vincent | 348/169 |
| 6,307,556 | B1 | * 10/2001 | Ellenby et al. | 345/427 |
| 6,330,523 | B1 | 12/2001 | Kacyra et al. | 702/159 |
| 6,420,698 | B1 | 7/2002 | Dimsdale | 250/234 |
| 6,473,079 | B1 | 10/2002 | Kacyra et al. | 345/419 |
| 6,526,352 | B1 | * 2/2003 | Breed et al. | 701/213 |
| 2001/0010546 | A1 | * 8/2001 | Chen | 348/218 |
| 2002/0060784 | A1 | * 5/2002 | Pack et al. | 356/6 |
| 2003/0090415 | A1 | * 5/2003 | Miyasaka et al. | 342/357.13 |

FOREIGN PATENT DOCUMENTS

| | | | |
|---|---|---|---|
| WO | WO 97/40342 | 10/1997 | |
| WO | WO 97/40342 A2 | * 10/1997 | ........... G01C/11/00 |
| WO | WO 01/04576 | 1/2001 | |
| WO | WO 01/88565 | 11/2001 | |
| WO | WO 01/88566 | 11/2001 | |
| WO | WO 01/88741 | 11/2001 | |
| WO | WO 01/88849 | 11/2001 | |
| WO | WO 02/16865 | 2/2002 | |

OTHER PUBLICATIONS

Klein, Konrad et al, "View Planning for the 3D Modelling of Real World Scenes," Proc. of the 2000 IEEE/RSJ International Co on Intelligent Robots and Systems, pp. 943–948.*

(List continued on next page.)

*Primary Examiner*—Gregory C. Issing
(74) *Attorney, Agent, or Firm*—Kory D. Christensen; Stoel Rives LLP

(57) ABSTRACT

A system for capturing a virtual model of a site includes a range scanner for scanning the site to generate range data indicating distances from the range scanner to real-world objects. The system also includes a global positioning system (GPS) receiver coupled to the range scanner for acquiring GPS data for the range scanner at a scanning location. In addition, the system includes a communication interface for outputting a virtual model comprising the range data and the GPS data.

36 Claims, 11 Drawing Sheets

OTHER PUBLICATIONS

Sato, Yukio et al, "Three–Dimensional Shape Reconstruction by Active Rangefinder," Proc. CVPR,. IEEE Computer Society Conf. on Computer Vision and Pattern Recognition, Jun. 1993, pp. 142–147.*

Modeling and Rendering of Real Environments by Wagner T. Correa et al.; RITA, vol. IX, Numero 1, Aug. 2002; pp. 1–32.

Scanalyze: a system for aligning and merging range data; http://graphics.standford.edu/software/scanalyze; dated Dec. 9, 2002; pp. 1–7.

Zippered Polygon Meshes from Range Images by Greg Turk et al.; Proc. SIGGRAPH '94, Jul. 1994; pp. 1–8.

A Volumetric Method for Building Complex Models from Range Images by Brian Curless et al.; Proc. SIGGRAPH '96, Aug. 1995; pp. 1–10.

* cited by examiner

GPS-ENHANCED SYSTEM AND METHOD FOR AUTOMATICALLY CAPTURING AND CO-REGISTERING VIRTUAL MODELS OF A SITE

CROSS REFERENCE TO RELATED APPLICATIONS

The application claims the benefit of U.S. Provisional Application No. 60/350,860, filed Jan. 22, 2002, for "System and Method for Generating 3-D Topographical Visualizations," with inventors Munish Vashisth and James U. Jensen, which application is incorporated herein by reference in its entirety.

BACKGROUND

1. Field of the Invention

The present invention relates generally to three-dimensional modeling. More specifically, the present invention relates to a system and method for capturing three-dimensional virtual models of a site that can be co-registered and visualized within a computer system.

2. Description of Related Background Art

Lidar (light detection and ranging) uses laser technology to make precise distance measurements over long or short distances. One application of lidar is the range scanner, or scanning lidar. In a typical range scanner, a lidar is mounted on a tripod equipped with a servo mechanism that continuously pans and tilts the lidar to scan a three-dimensional area. During the scanning process, the lidar makes repeated range measurements to objects in its path. The resulting range data may be collected and serve as a rough model of the scanned area.

Physical limitations of the range scanner constrain the maximum resolution of the range data, which decreases with distance from the range scanner. At large distances, the range scanner may not be able to discern surface details of an object. A lack of continuous spatial data (gaps between points) and a lack of color attributes are significant limitations of conventional range scanners. Furthermore, a range scanner only scans objects within the lidar's line-of-sight. As a result, no data is collected for the side of an object opposite to the lidar or for objects obscured by other objects ("occlusions").

To obtain a more complete and accurate model, the range scanner can be moved to other scanning locations in order to scan the same area from different perspectives and thereby obtain range data for obscured objects. Thereafter, the resulting sets of range data can be merged into a single model.

Unfortunately, the merging of sets of range data is not automatic. Human decision-making is generally required at several steps in the merging process. For instance, a human surveyor is typically needed to determine the relative distances between the range scanning locations and the scanned area. Furthermore, a human operator must manually identify points in common ("fiducials") between multiple sets of range data in order to align and merge the sets into a single model. Such identification is by no means easy, particularly in the case of curved surfaces. The need for human decision-making increases the cost of modeling and the likelihood of error in the process.

SUMMARY OF THE INVENTION

A system for capturing a virtual model of a site includes a range scanner for scanning the site to generate range data indicating distances from the range scanner to real-world objects. The system also includes a global positioning system (GPS) receiver coupled to the range scanner for acquiring GPS data for the range scanner at a scanning location. In addition, the system includes a communication interface for outputting a virtual model comprising the range data and the GPS data.

The system may further include a transformation module for using the GPS data with orientation information, such as bearing, for the range scanner to automatically transform the range data from a scanning coordinate system to a modeling coordinate system, where the modeling coordinate system is independent of the scanning location. A co-registration module may then combine the transformed range data with a second set of transformed range data for the same site generated at a second scanning location.

The system also includes a digital camera coupled to the range scanner for obtaining digital images of the real-world objects scanned by the range scanner. The system may associate the digital images of the real-world objects with the corresponding range data in the virtual model.

A system for building a virtual model of a site includes a communication interface for receiving a first set of range data indicating distances from a range scanner at a first location to real-world objects. The communication interface also receives a first set of GPS data for the range scanner at the first location. The system further includes a transformation module for using the first set of GPS data with orientation information for the range scanner to automatically transform the first set of range data from a first local coordinate system to a modeling coordinate system.

A system for modeling an object includes a range scanner for scanning an object from a first vantage point to generate a first range image. The system further includes a GPS receiver for obtaining GPS readings for the first vantage point, as well as a storage medium for associating the first range image and the GPS readings within a first virtual model.

The range scanner may re-scan the object from a second vantage point to generate a second range image. Likewise, the GPS receiver may acquire updated GPS readings for the second vantage point, after which the storage medium associates the second range image and the updated GPS readings within a second virtual model. A transformation module then employs the GPS readings of the virtual models with orientation information for the range scanner at each location to automatically transform the associated range images from local coordinate systems referenced to the vantage points to a single coordinate system independent of the vantage points.

BRIEF DESCRIPTION OF THE DRAWINGS

Non-exhaustive embodiments of the invention are described with reference to the figures, in which.

DETAILED DESCRIPTION

Figure 1:
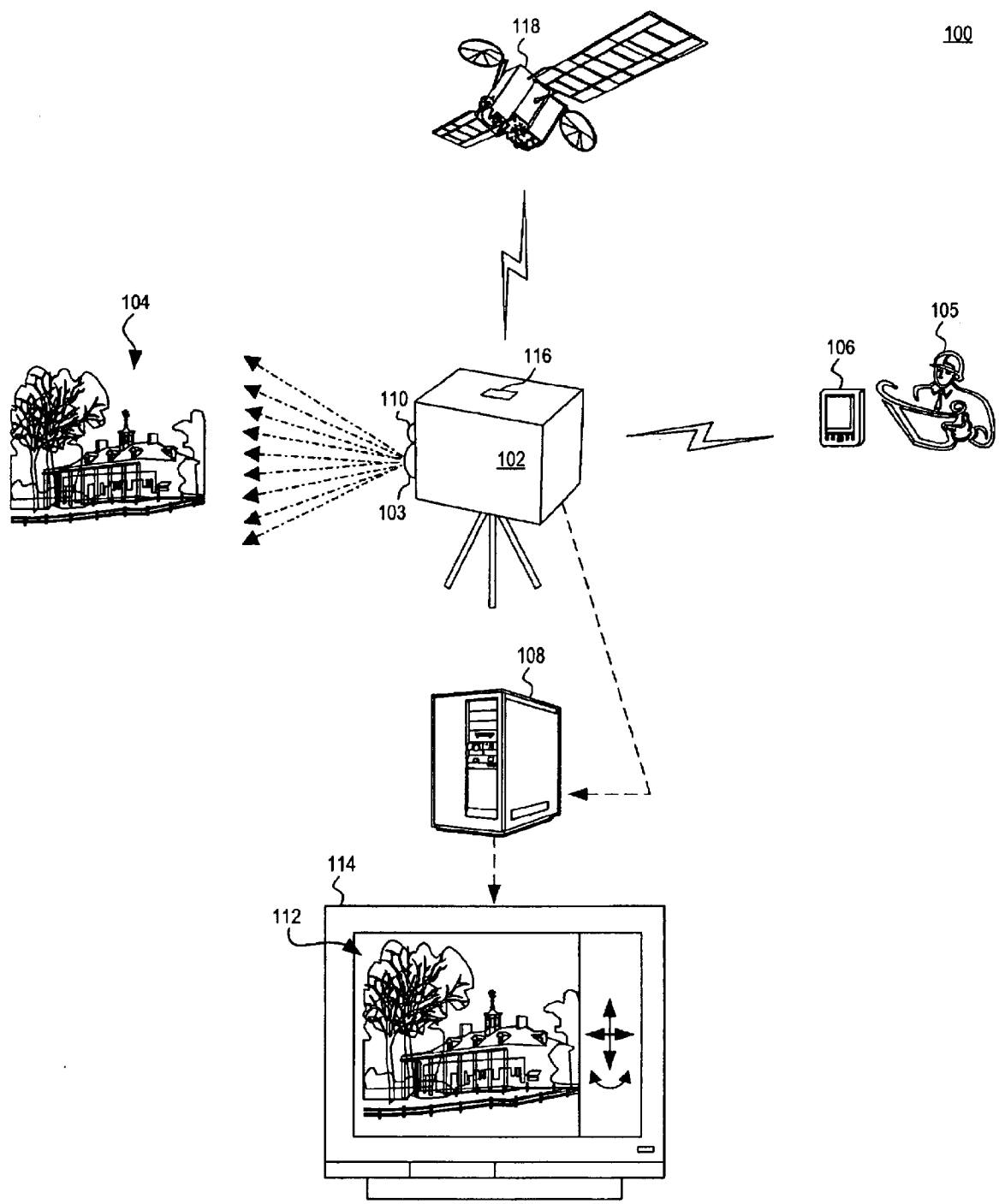
FIG. 1 is a high-level overview of a system for capturing and co-registering virtual models.

Reference is now made to the figures in which like reference numerals refer to like elements. For clarity, the first digit of a reference numeral indicates the figure number in which the corresponding element is first used.

In the following description, numerous specific details of programming, software modules, user selections, network transactions, database queries, database structures, etc., are provided for a thorough understanding of the embodiments of the invention. However, those skilled in the art will recognize that the invention can be practiced without one or more of the specific details, or with other methods, components, materials, etc. In some cases, well-known structures, materials, or operations are not shown or not described in detail to avoid obscuring aspects of the invention. Furthermore, the described features, structures, or characteristics may be combined in any suitable manner in one or more embodiments.

FIG. 1 is a high-level overview of a modeling system 100 according to an embodiment of the invention. A range scanner 102 includes a lidar 103 for scanning a site 104 to generate range data, i.e., distance measurements from the range scanner 102 to real-world objects within the site 104. The site 104 may be any indoor or outdoor three-dimensional region that includes one or more objects to which distance measurements can be made using the lidar 103.

The location and dimensions of the site 104 may be defined by an operator 105 using a control device, such as a personal data assistant (PDA) 106, computer 108, or the like, which may communicate with the range scanner 102 using any wired or wireless method. The operator 105 may specify, for instance, the degree to which the range scanner 102 pans and tilts during scanning, effectively determining the dimensions of the site 104.

In one embodiment, the range scanner 102 is equipped with a high-resolution, high-speed digital camera 110 for obtaining digital images of the site 104 during the scanning process. As explained more fully below, the digital images may be later used to apply textures to a polygon mesh created from the range data, providing a highly realistic three-dimensional visualization 112 of the site 104 for display on a computer monitor 114 or other display device.

The range scanner 102 also includes a global positioning system (GPS) receiver 116 for acquiring GPS data relative to the range scanner 102 at the location of scanning. The GPS data may include, for example, the latitude, longitude, and altitude of the range scanner 102. In other embodiments, the GPS data may include Universal Transverse Mercator (UTM) coordinates, Earth-Centered/Earth-Fixed (ECEF) coordinates, or other Earth-based locators. A GPS receiver 116 relies on three or more orbiting satellites 118 for triangulation and, in some configurations, can provide readings accurate to within a few centimeters.

In one embodiment, the range scanner 102 sends the range data, digital images, and GPS data to a computer 108, where they are used to create the visualization 112. The visualization 112 may be interactive, e.g., a user may "walk through" the site 104 depicted in the visualization 112. In addition, the user may delete or move objects depicted in the visualization 112 or modify the visualization 112 in other ways. Such visualizations 112 are highly beneficial in the fields of architecture, landscape design, land use, erosion control, etc.

Figure 2:
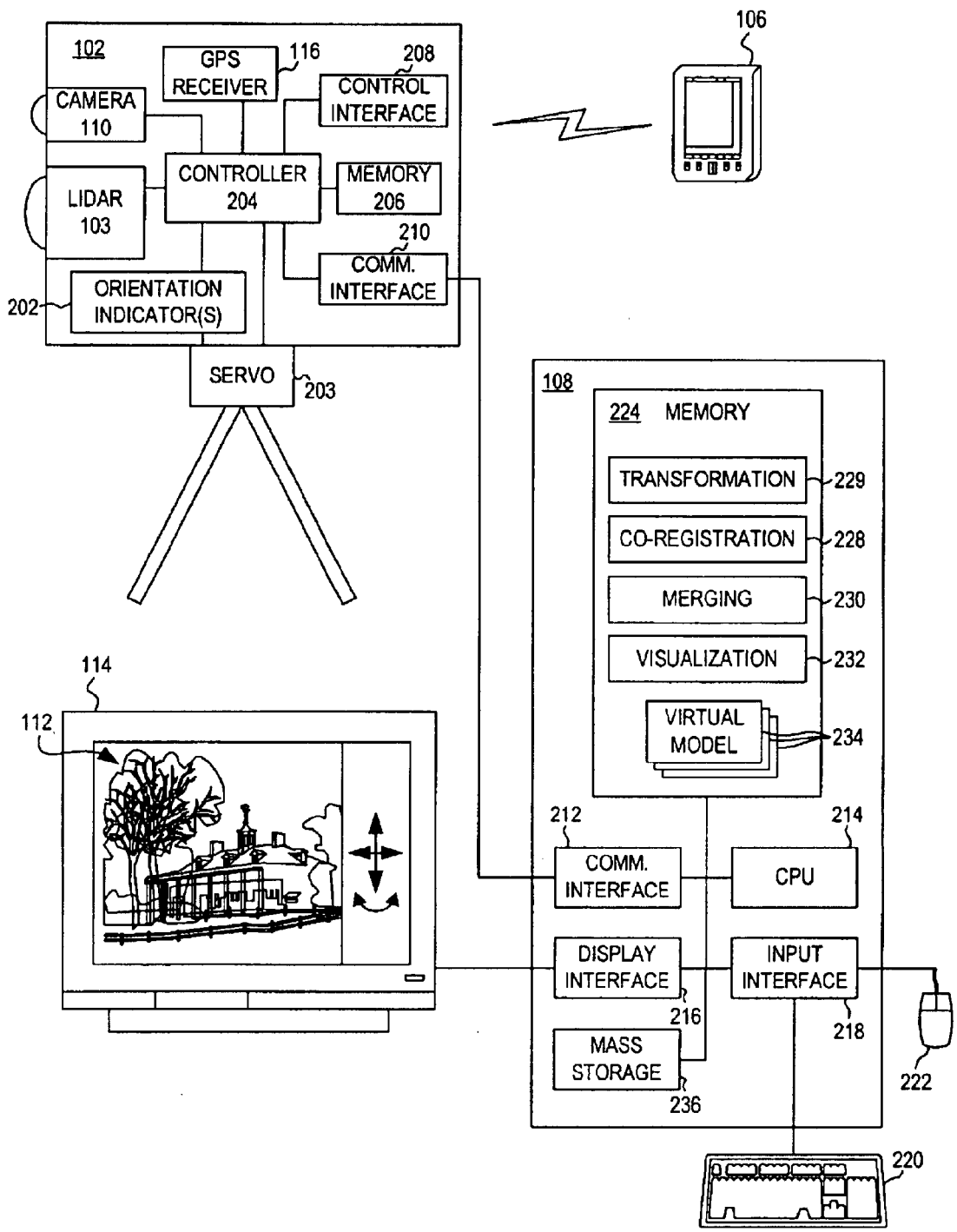
FIG. 2 is a detailed block diagram of the system of FIG. 1.

FIG. 2 is a detailed block diagram of the system 100 of FIG. 1. As noted above, the range scanner 102 includes a lidar 103, a digital camera 110, and a GPS receiver 116. The lidar 103 may be embodied, for instance, as an LMS 291, available SICK AG of Waldkirch, Germany, although various other models are contemplated.

The digital camera 110 may include a PowerShot G2™ camera available from Canon, Inc. In one configuration, the digital camera 110 is capable of capturing images with a resolution of 2272×1704 pixels at a rate of approximately 2.5 images per second. The digital camera 110 may be included within, attached to, or otherwise integrated with the range scanner 102. In alternative embodiments, the range scanner 102 includes multiple digital cameras 110.

The GPS receiver 116 may be embodied as a standard mapping-grade receiver, which may support L-band differential GPS (DGPS). Where higher accuracy is needed, survey-grade receivers may be used, such as a carrier phase (CPH) or real-time kinematic (RTK) GPS. In such embodiments, a base station (not shown) having a known Earth location broadcasts an error correction signal that is used by the GPS receiver 116 to achieve accuracy to within a few centimeters. An example of a suitable GPS receiver 116 is the ProMark2™ survey system available from Ashtech, Inc. of Santa Clara, Calif. Like the digital camera 110, the GPS receiver 116 may be included within, attached to, or otherwise integrated with the range scanner 102.

The range scanner 102 may also include one or more orientation indicator(s) 202 for providing information about the orientation of the range scanner 102 with respect to the Earth. For example, one indicator 202 may provide a bearing or heading (azimuth) of the range scanner 102. Azimuth is typically expressed as a horizontal angle of the observer's bearing, measured clockwise from a referent direction, such as North. A bearing indicator 202 may be embodied, for instance, as a high-accuracy compass capable of digital output.

Some GPS receivers 116 may include compasses, gyroscopes, inertial navigation systems, etc., for providing highly accurate bearing and/or other orientation information. For example, the ProMark2™ survey system described above provides an azimuth reading. Similarly, a bearing may be obtained indirectly from GPS readings, since two precise GPS coordinates define a bearing. Thus, the orientation indicator 202 need not be separate component.

In certain implementations, an indicator 202 may provide the tilt or inclination of the range scanner 102 with respect to the Earth's surface. For example, the range scanner 102 may be tilted with respect to one or two axes. For simplicity, however, the following exemplary embodiments assume that the range scanner 102 is level prior to scanning.

As depicted, the range scanner 102 further includes a servo 203 for continuously changing the bearing and/or tilt of the range scanner 102 to scan a selected site 104. The servo 203 may include high-accuracy theodolite-type optical or electronic encoders to facilitate high-resolution scanning.

In one embodiment, the servo 203 only tilts the range scanner 102, while a continuously rotating prism or mirror performs the panning or rotation function. Alternatively, the range scanner 102 could be mounted at a 90° angle, in which case the servo 203 is used for panning. Thus, any appropriate mechanical and/or electronic means, such as stepper motors, diode arrays, etc., may be used to control the bearing and/or tilt of the range scanner 102 within the scope of the invention.

In one embodiment, the servo 203, as well as the other components of the range scanner 102, are directed by a controller 204. The controller 204 may be embodied as a microprocessor, microcontroller, digital signal processor (DSP), or other control device known in the art.

The controller 204 is coupled to a memory 206, such as a random access memory (RAM), read-only memory (ROM), or the like. In one configuration, the memory 206 is used to buffer the range data, digital images, and GPS data during the scanning process. The memory device 206 may also be used to store parameters and program code for operation of the range scanner 102.

In addition, the controller 204 is coupled to a control interface 208, such as an infrared (IR) receiver, for receiving IR-encoded commands from the PDA 106. Various other control interfaces 208 may be used, however, such as an 802.11b interface, an RS-232 interface, a universal serial bus (USB) interface, or the like. As previously noted, the PDA 106 is used to program the range scanner 102. For example, the PDA 106 may specify the size of the site 104 to be scanned, the resolution of the range data and digital images to be collected, etc.

The controller 204 is also coupled to a communication interface 210 for sending the captured range data, digital images, and GPS data to the computer 108 for further processing. The communication interface 210 may include, for instance, an Ethernet adapter, a IEEE 1349 (Firewire) adaptor, a USB adaptor, or other high-speed communication interface.

The communication interface 210 of the range scanner 102 is coupled to, or in communication with, a similar communication interface 212 within the computer 108. The computer 108 may be embodied as a standard IBM-PC™ compatible computer running a widely-available operating system (OS) such as Windows XP™ or Linux™.

The computer 108 also includes a central processing unit (CPU) 214, such as an Intel™ x86 processor. The CPU 214 is coupled to a standard display interface 216 for displaying text and graphics, including the visualization 112, on the monitor 114. The CPU 214 is further coupled to an input interface 218 for receiving data from a standard input device, such as a keyboard 220 or mouse 222.

The CPU 214 is coupled to a memory 224, such as a RAM, ROM, or the like. As described in greater detail hereafter, the memory 224 includes various software modules or components, including a co-registration module 228, transformation module 229, a merging module 230, and a visualization module 232. The memory 224 may further include various data structures, such as a number of virtual models 234.

Briefly, the co-registration module 228 automatically co-registers sets of range data from different views (e.g., collected from different vantage points) using the GPS data and orientation information. Co-registration places the sets of range data 302 within the same coordinate system and combining the sets into a single virtual model 234. In addition, co-registration may require specific calibration of instruments for parallax and other idiosyncrasies.

The transformation module 229 performs the necessary transformations to convert each set of range data from a local scanning coordinate system referenced to a particular scanning location to a modeling coordinate system that is independent of the scanning location. Since transformation is typically part of co-registration, the transformation module 229 may be embodied as a component of the co-registration module 228 in one embodiment.

The merging module 230 analyzes the range data 302 to correct for errors in the scanning process, eliminating gaps, overlapping points, and other incongruities. Thereafter, the visualization module 232 produces the interactive, three-dimensional visualization 112, as explained in greater detail below.

In alternative embodiments, one or more of the described modules may be implemented using hardware or firmware, and may even reside within the range scanner 102. Thus, the invention should not be construed as requiring a separate computer 108.

In one configuration, the computer 108 includes a mass storage device 236, such as a hard disk drive, optical storage device (e.g., DVD-RW), or the like, which may be used to store any of the above-described modules or data structures. Hence, references herein to "memory" or "storage media" should be construed to include any combination of volatile, non-volatile, magnetic, or optical storage media.

Figure 3:
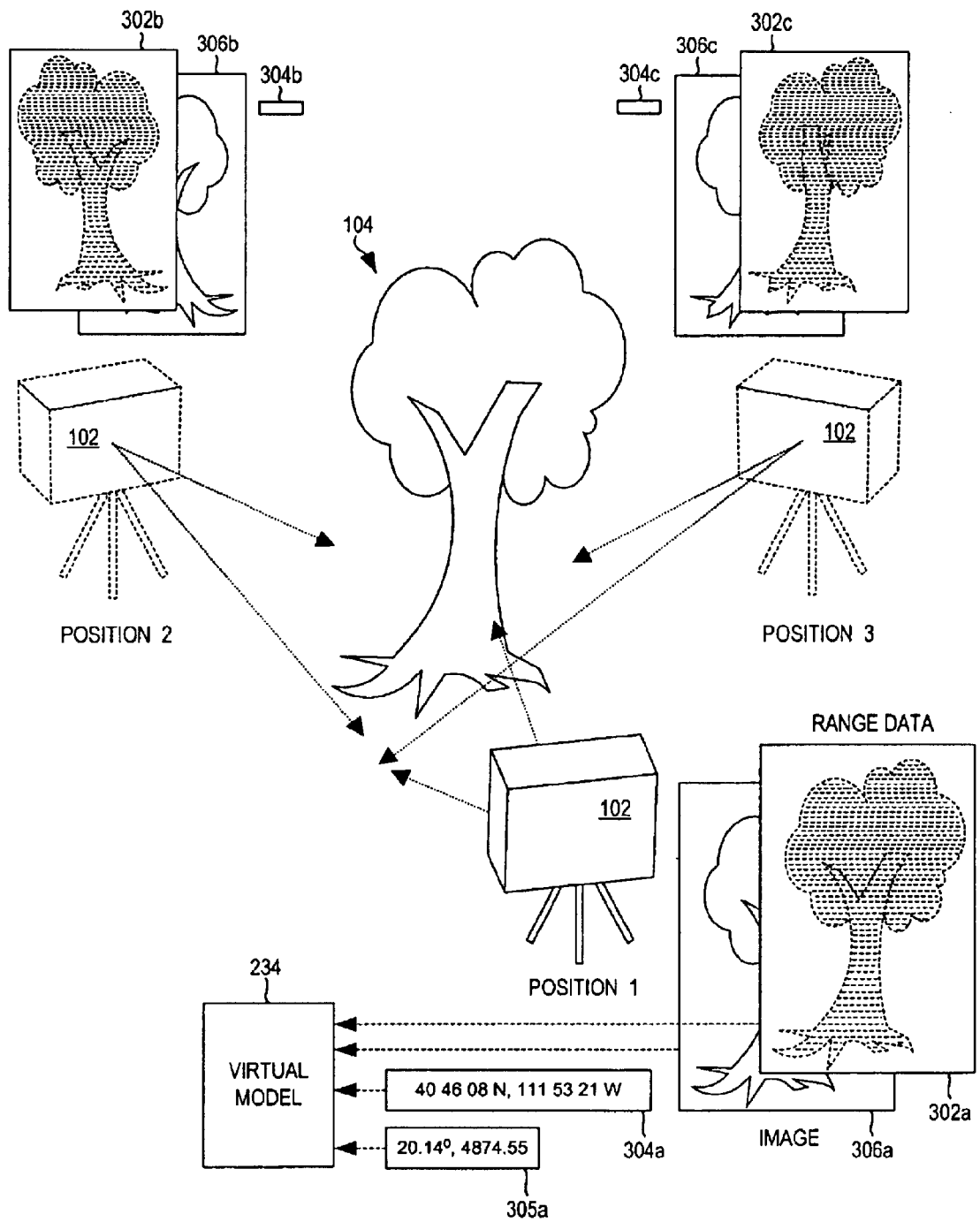
FIG. 3 is a schematic illustration of capturing one or more virtual models of a site at each of a number of positions or vantage points.

Referring to FIG. 3, one or more virtual models 234 of a site 104 may be captured at each of a number of positions or vantage points. At each position, the range scanner 102 generates range data 302 indicating distances to objects (e.g., a tree) within the site 104. A set of range data 302 is sometimes referred to as a "range image," although the range data 302 need not be stored or presented in a conventional image format. The terms "range data" and "range image" are used herein interchangeably.

The pattern of marks depicted within the range data 302 represents sample points, i.e., points at which a range measurement has been taken. The density or resolution of the range data 302 depends on the distance of the object from the range scanner 102, as well as the precision and accuracy of the lidar 103 and the mechanism for panning and/or tilting the lidar 103 relative to its platform. Although FIG. 3 suggests a horizontal scanning pattern, the range data 302 could also be generated using a vertical or spiral scanning pattern.

As previously noted, the GPS receiver 116 associated with the range scanner 102 obtains GPS data 304 (e.g., latitude, longitude, altitude) relative to the range scanner 102 at the scanning position. Additionally, the orientation indicator(s) 202 may provide orientation information 305, e.g., bearing, tilt.

The camera 110 associated with the range scanner 102 obtains one or more high-resolution digital images 306 of the site 104. The resolution of the digital images 306 will typically far exceed the resolution of the range data 302.

The range data 302, GPS data 304, orientation information 305, and digital images 306 are collected at each scanning position or location and represent a virtual model 234 of the site 104. Separate virtual models 234 are generated from the perspective of each of the scanning positions. Of course, any number of virtual models 234 of the site 104 can be made within the scope of the invention.

In certain instances, a data structure lacking one or more of the above-described elements may still be referred to as a "virtual model." For example, a virtual model 234 may not include the digital images 306 or certain orientation information 305 (such as tilt data where the range scanner 102 is level during scanning).

Figure 4:
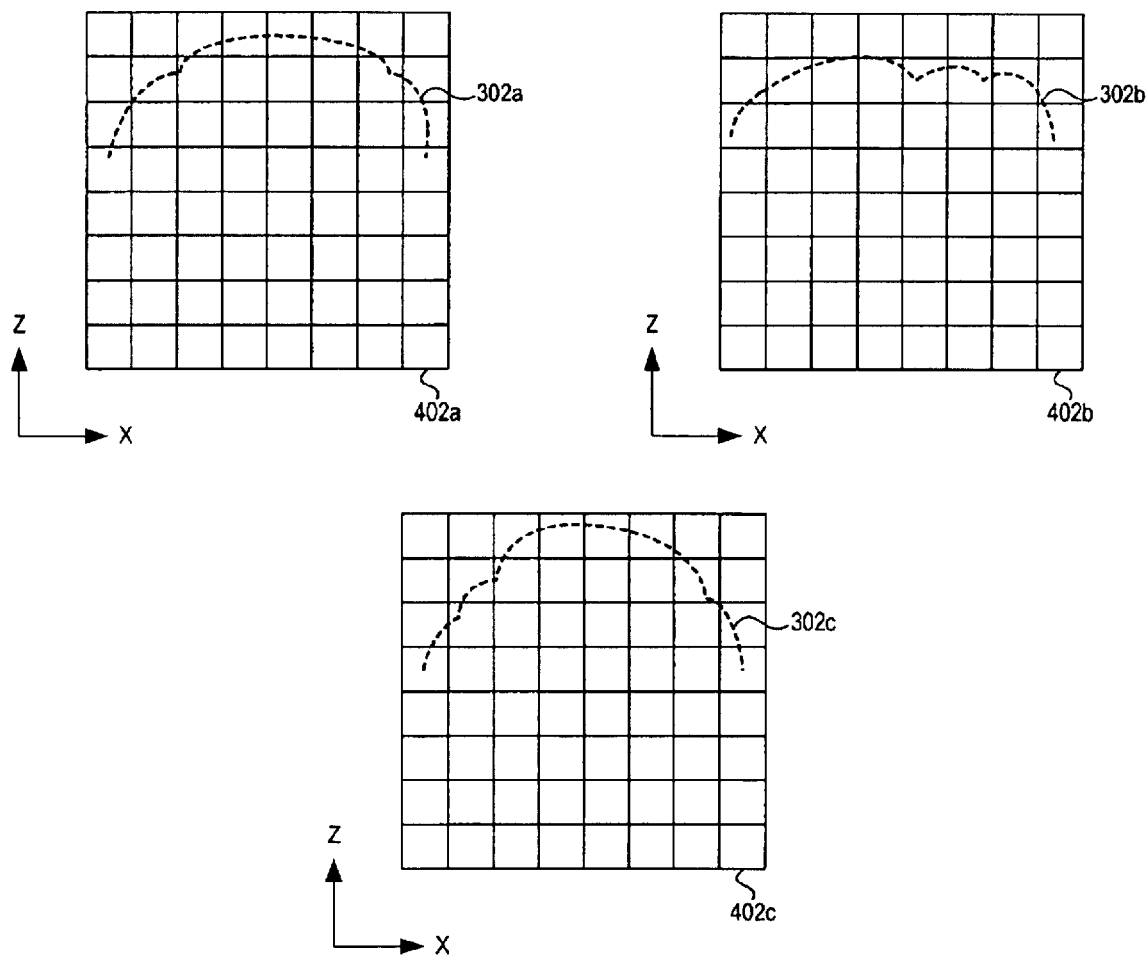
FIG. 4 is a schematic illustration of three sets of range data.

FIG. 4 depicts the three sets of range data 302a–c from top-down views rather than the side views of FIG. 3. As shown, each set represents only a portion of the site 104, since the range scanner 102 is not able to "see" behind objects.

Figure 5:
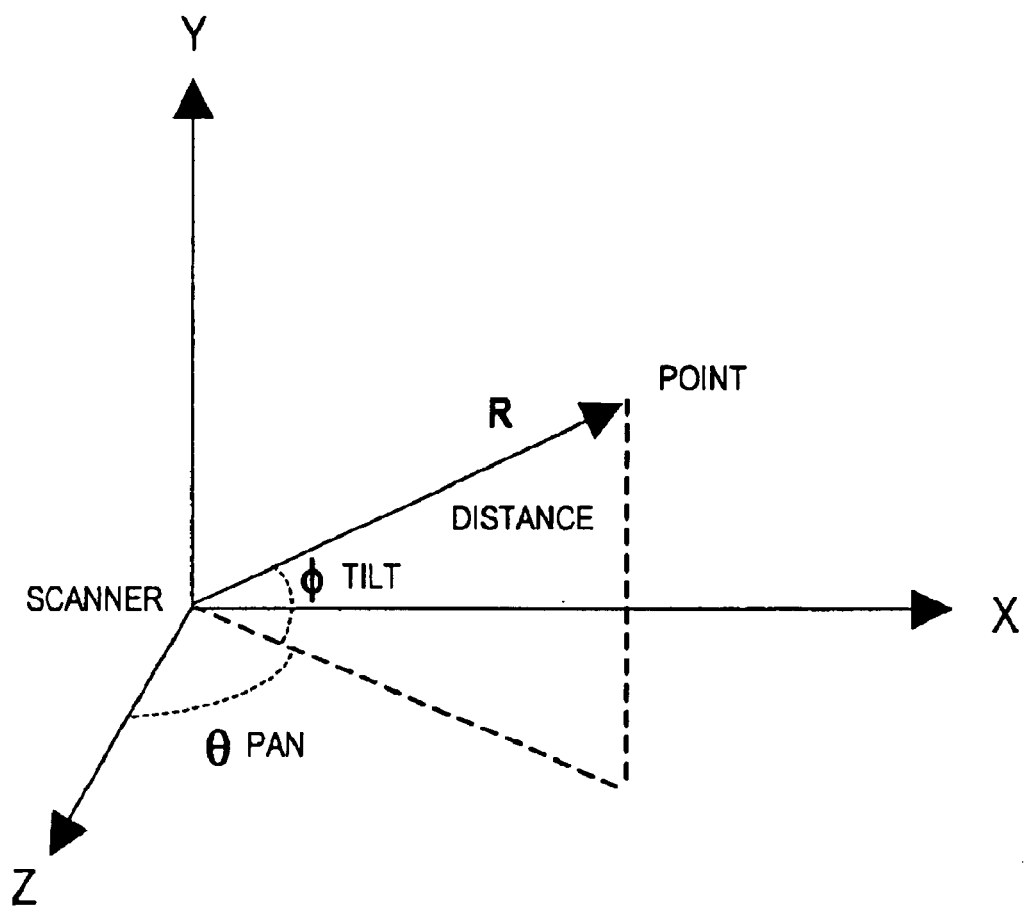
FIG. 5 is a representation of a scanning coordinate system.

In general, each of the sets of range data 302a–c have separate scanning coordinate systems 402a–c that are referenced to the scanning positions. Typically, the range data 302 is initially captured in a polar (or polar-like) coordinate system. For example, as shown in FIG. 5, an individual range measurement may be represented by $P(R, \phi, \theta)$, where R is the range (distance) from the range scanner 102, $\phi$ is the degree of tilt, and $\theta$ is the degree of panning.

Converting polar range-data 304 into the depicted Cartesian coordinates may be done using standard transformations, as shown below.

$$X = R \cos \phi \cos \theta \quad \text{Eq. 1}$$

$$Y = R \sin \phi \quad \text{Eq. 2}$$

$$Z = R \cos \phi \sin \theta \quad \text{Eq. 3}$$

In certain embodiments, the geometry of the range scanner 102 (e.g., the axis of rotation, offset, etc.) may result in a polar-like coordinate system that requires different transformations, as will be known to those of skill in the art. In general, the origin of each of the scanning coordinate systems 402a–c is the light-reception point of the lidar 103.

Figure 6:
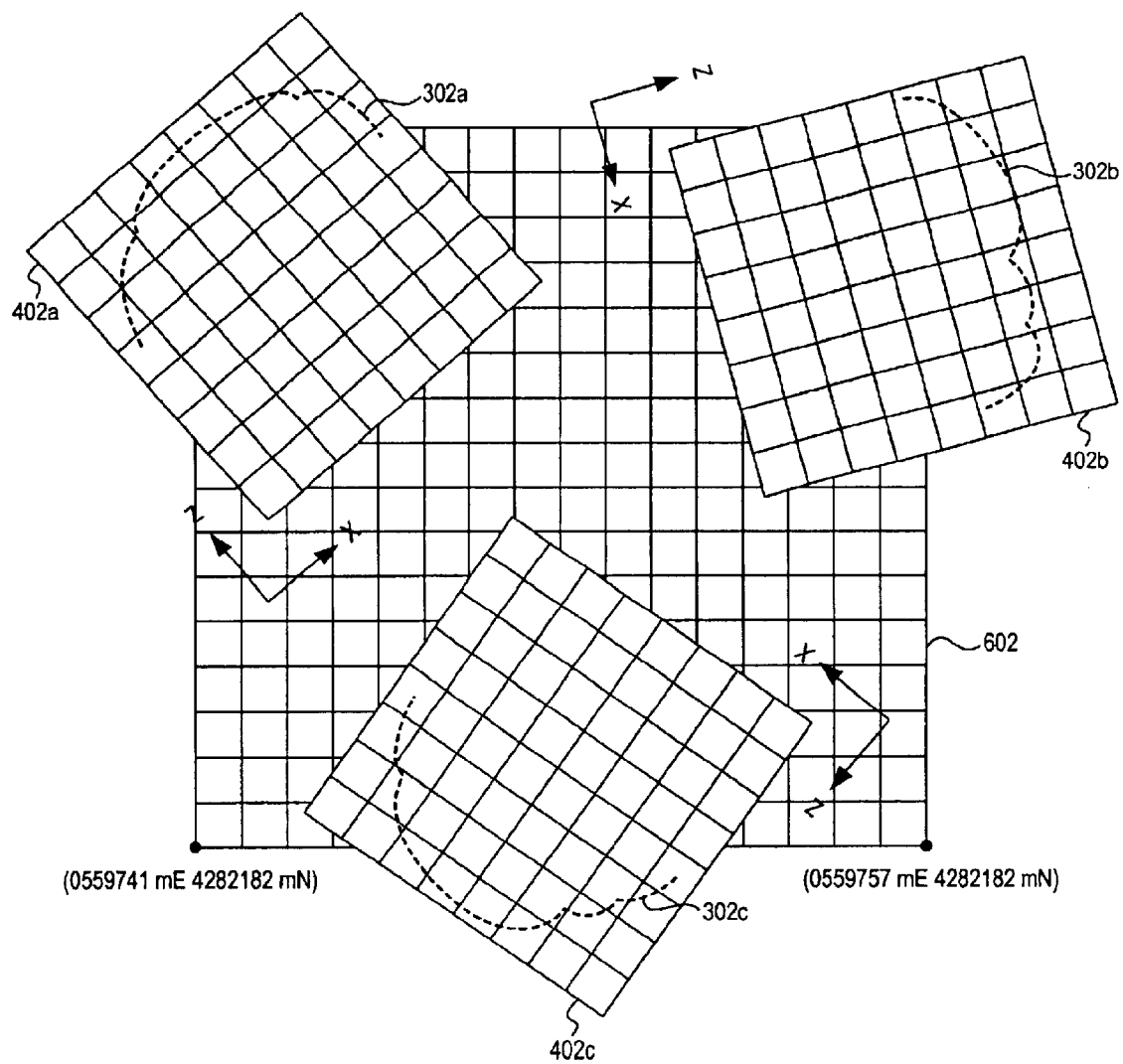
FIG. 6 is a schematic illustration of transforming range data from various scanning coordinate systems to a single modeling coordinate system.

Referring to FIG. 6, in order to combine or "co-register" the virtual models 234 from the various scanning positions, the transformation module 229 transforms the range data 302a–c from their respective scanning coordinate systems 402a–c to a single modeling coordinate system 602 that is independent of the scanning positions and the orientation of the range scanner 102.

In one embodiment, the modeling coordinate system 602 is based on a geographic coordinate system, such as Universal Transverse Mercator (UTM), Earth-Centered/Earth-Fixed (ECEF), or longitude/latitude/altitude (LLA). GPS receivers 104 are typically able to display Earth-location information in one or more of these coordinate systems. UTM is used in the following examples because it provides convenient Cartesian coordinates in meters. In the following examples, the UTM zone is not shown since the range data 302 will typically be located within a single zone.

As depicted in FIG. 6, the transformation module 229 initially rotates each set of range data 302a–c by the bearing of the range scanner 102 obtained from the orientation information 305. After a set of range data 302 has been converted into Cartesian coordinates, each point may be rotated around the origin by the following transformation, where b is the bearing.

$$X_1 = X \cos(b) - Z \sin(b) \quad \text{Eq. 4}$$

$$Z_1 = Z \cos(b) + X \sin(b) \quad \text{Eq. 5}$$

These equations assume that the range scanner 102 was level at the time of scanning, such that the XZ planes of the scanning coordinate system 402 and modeling coordinate system 602 are essentially co-planer. If, however, the range scanner 102 was tilted with respect to the X and/or Z axes, the transformations could be modified by one of skill in the art.

Figure 7:
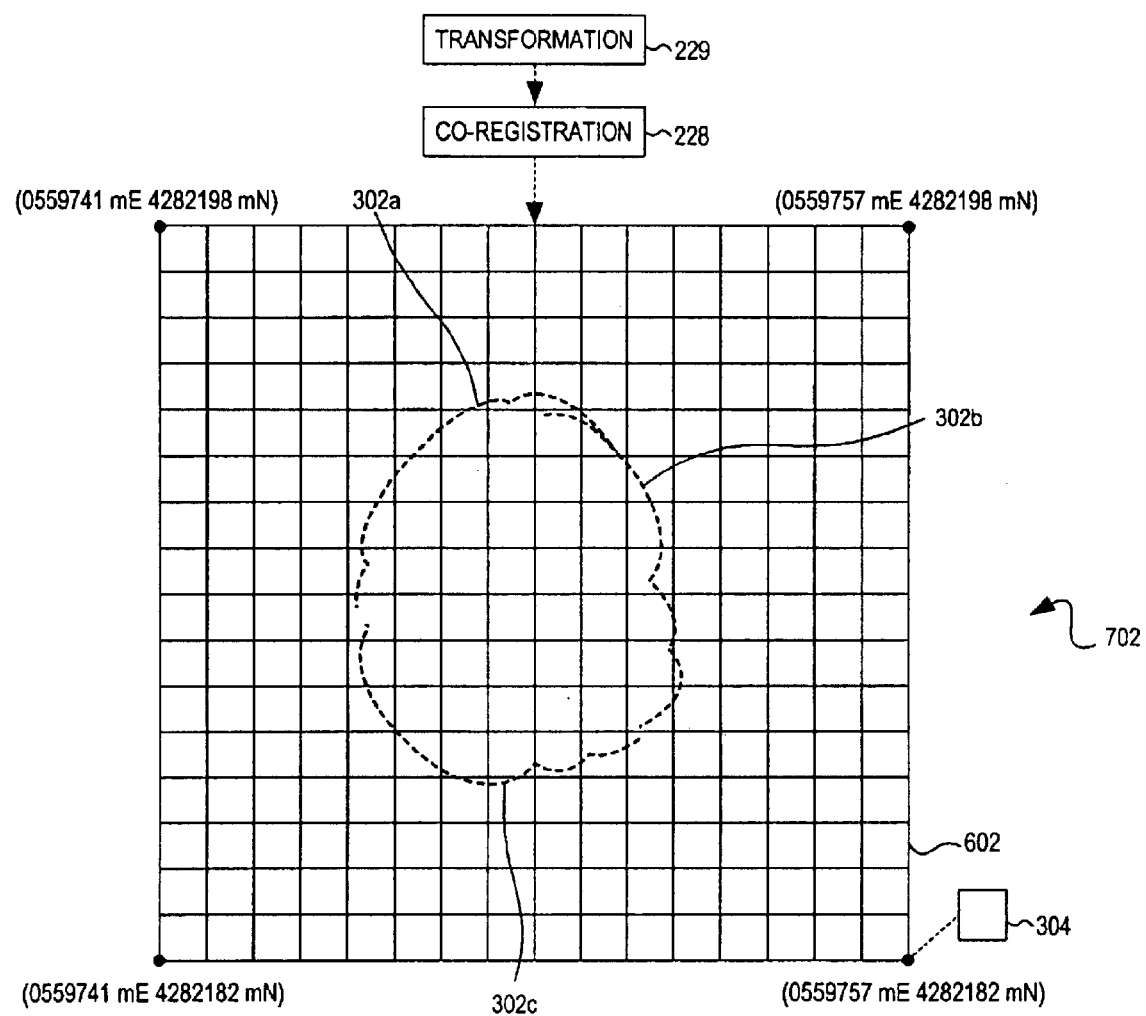
FIG. 7 is a schematic illustration of generating a combined or transformed virtual model.

Next, as shown in FIG. 7, the transformation module 229 uses the GPS data 304 to translate the range data 302 to the correct location within the modeling coordinate system 602. In one embodiment, this is done by adding the coordinates from the GPS data 304 to each of the range data coordinates, as shown below.

$$X_2 = X_1 + GPS_E \quad \text{Eq. 6}$$

$$Y_2 = Y_1 + GPS_H \quad \text{Eq. 7}$$

$$Z_2 = Z_1 + GPS_N \quad \text{Eq. 8}$$

where $GPS_E$ is the UTM "easting,"

$GPS_H$ is the altitude (typically the height above the reference ellipsoid), and $GPS_N$ is the UTM "northing."

The UTM easting and northing for number of points in the modeling coordinate system 602 are shown in FIG. 7, and are typically represented on maps using the "mE" (meters East) and "mN" (meters North) labels.

Those of skill in the art will recognize that the invention is not limited to UTM coordinates and that transformations exist for other coordinate systems, such as ECEF and LLA. In certain embodiments, the modeling coordinate system 602 may actually be referenced to a local landmark or a point closer to the range data 302, but will still be geographically oriented.

In the preceding example, the units of the range data 302 and GPS data 304 are both in meters. For embodiments in which the units differ, a scaling transformation will be needed. Furthermore, while FIGS. 6 and 7 show particular types of transformations, those of skill in the art will recognize that different transformations may be required based on the geometry of the range scanner 102, whether the range scanner 102 was tilted with respect to the XZ plane, and the like.

When the transformation is complete, the co-registration module 228 co-registers or combine the range data 302a–c from the various views into a co-registered model 702 of the entire site 104. This may involve, for example, combining the sets of range data 302a–c into a single data structure, while still preserving the ability to access the individual sets.

In one embodiment, the co-registered model 702 includes GPS data 304 for at least one point. This allows the origin of the modeling coordinate system 602 to be changed to any convenient location, while still preserving a geographic reference.

As illustrated in FIG. 7, a co-registered model 702 is not perfect. Noise and other sources of error may result in various gaps, incongruities, regions of overlap, etc. Thus, while the co-registration module 228 automatically places the range data 302a–c within close proximity to their expected locations, eliminating the need for human decision-making, the range data 302a–c are not truly merged. For example, two separate points may exist within the co-registered model 702 that should actually refer to the same physical location in the site 104.

Figure 8:
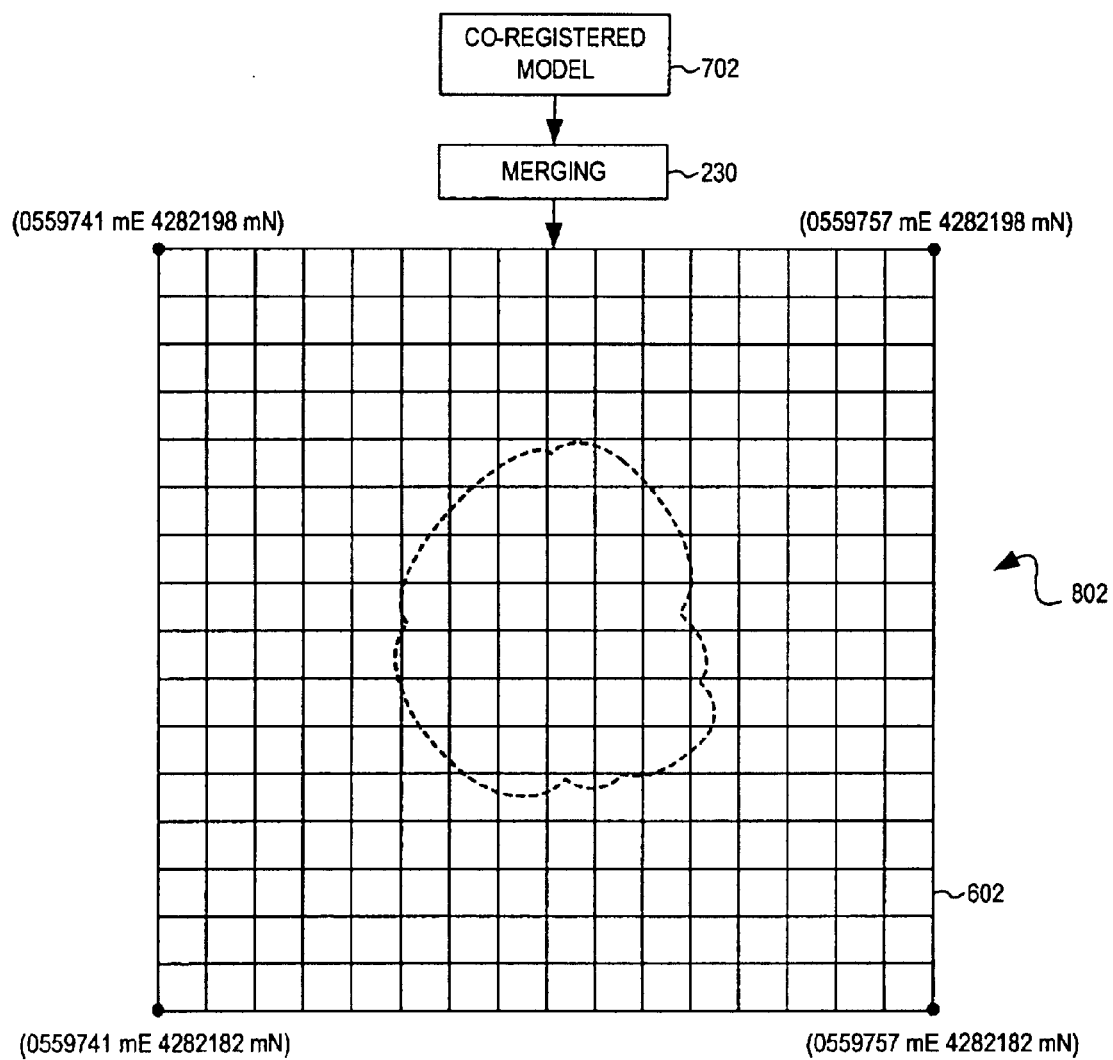
FIG. 8 is a schematic illustration of generating a merged virtual model.

Referring to FIG. 8, a merging module 230 addresses this problem by merging the range data 302a–c from the co-registered model 702 into a single merged model 802. The merging module 230 makes fine adjustments to the transformed range data 302a–c, eliminating the gaps, incongruities, and regions of overlap. In addition, merging module 230 may eliminate redundancy by merging points from the transformed range data 302a that represent the same physical location. This is accomplished, in one embodiment, using an iterative closest point (ICP) algorithm, as known to those of skill in the art.

In one embodiment, the merging module 230 incorporates the Scanalyze™ product available from Stanford University. Scanalyze™ is an interactive computer graphics application for viewing, editing, aligning, and merging range images to produce dense polygon meshes.

Scanalyze™ processes three kinds of files: triangle-mesh PLY files (extension .ply), range-grid PLY files (also with extension .ply), and SD files (extension .sd). Triangle-mesh PLY files encode general triangle meshes as lists of arbitrarily connected 3D vertices, whereas range-grid PLY files and SD files encode range images as rectangular arrays of points. SD files also contain metadata that describe the geometry of the range scanner 102 used to acquire the data. This geometry is used by Scanalyze™ to derive line-of-sight information for various algorithms. PLY files may also encode range images (in polygon mesh form), but they do not include metadata about the range scanner and thus do not provide line-of-sight information.

Once the PLY or SD files have been loaded, they can be pairwise aligned using a variety of techniques—some manual (i.e. pointing and clicking) and some automatic (using a variant of the ICP algorithm).

Pairs of scans can be selected for alignment either automatically (so-called all-pairs alignment) or manually, by choosing two scans from a list. These pairwise alignments can optionally be followed by a global registration step whose purpose is to spread the alignment error evenly across the available pairs. The new positions and orientations of each PLY or SD file can be stored as a transform file (extension .xf) containing a 4×4 matrix.

Figure 9:
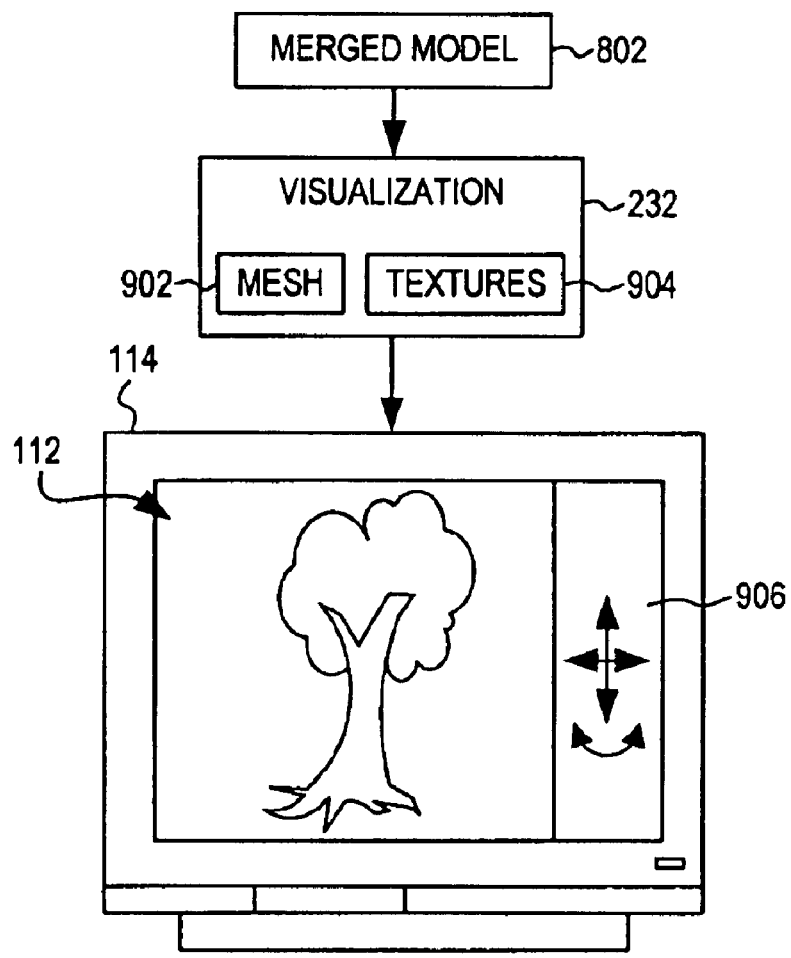
FIG. 9 is a schematic illustration of generating an interactive, three-dimensional visualization.

Referring to FIG. 9, the visualization module 232 uses the merged model 802 of FIG. 8 to create an interactive, three-dimensional visualization 112 of the site 104. To accomplish this, the visualization module 232 may convert the transformed/merged range data 302 into a polygon mesh 902. Various known software applications are capable of producing a polygon mesh 902 from range data 302, such as the Volumetric Range Image Processing Package (VripPack), available from Stanford University. VripPack is a set of source code, scripts, and binaries for creating surface reconstructions from range images. For example, the VripPack merges range images into a compressed volumetric grid, extracts a surface from the compressed volumetric grid, fills holes in the reconstruction by carving out empty space, removes small triangles from the reconstruction, and performs a simple 4-level decimation for interactive rendering.

The visualization module 232 also decomposes the digital images 306 into textures 904, which are then applied to the polygon mesh 902. In essence, the digital images 306 are "draped" upon the polygon mesh 902. Due to the relatively higher resolution of the digital images 306, the textures 904 add a high degree of realism to the visualization 112. Techniques and code for applying textures 904 to polygon meshes 902 are known to those of skill in the art.

In one embodiment, the mesh 902 and textures 904 are used to create the visualization 112 of the site 104 using a standard modeling representation, such as the virtual reality modeling language (VRML). Thereafter, the visualization 112 can be viewed using a standard VRML browser, or a browser equipped with a VRML plugin, such as the Microsoft™ VRML Viewer. Of course, the visualization 112 could also be created using a proprietary representation and viewed using a proprietary viewer.

As depicted in FIG. 9, the browser may provide navigation controls 906 to allow the user to "walk through" the visualization 112. In addition, the user may delete or move objects shown in the visualization 112 or modify the visualization 112 in other ways. As noted, such visualizations 112 are highly beneficial in the fields of architecture, landscape design, land use, erosion control, and the like.

Figure 10:
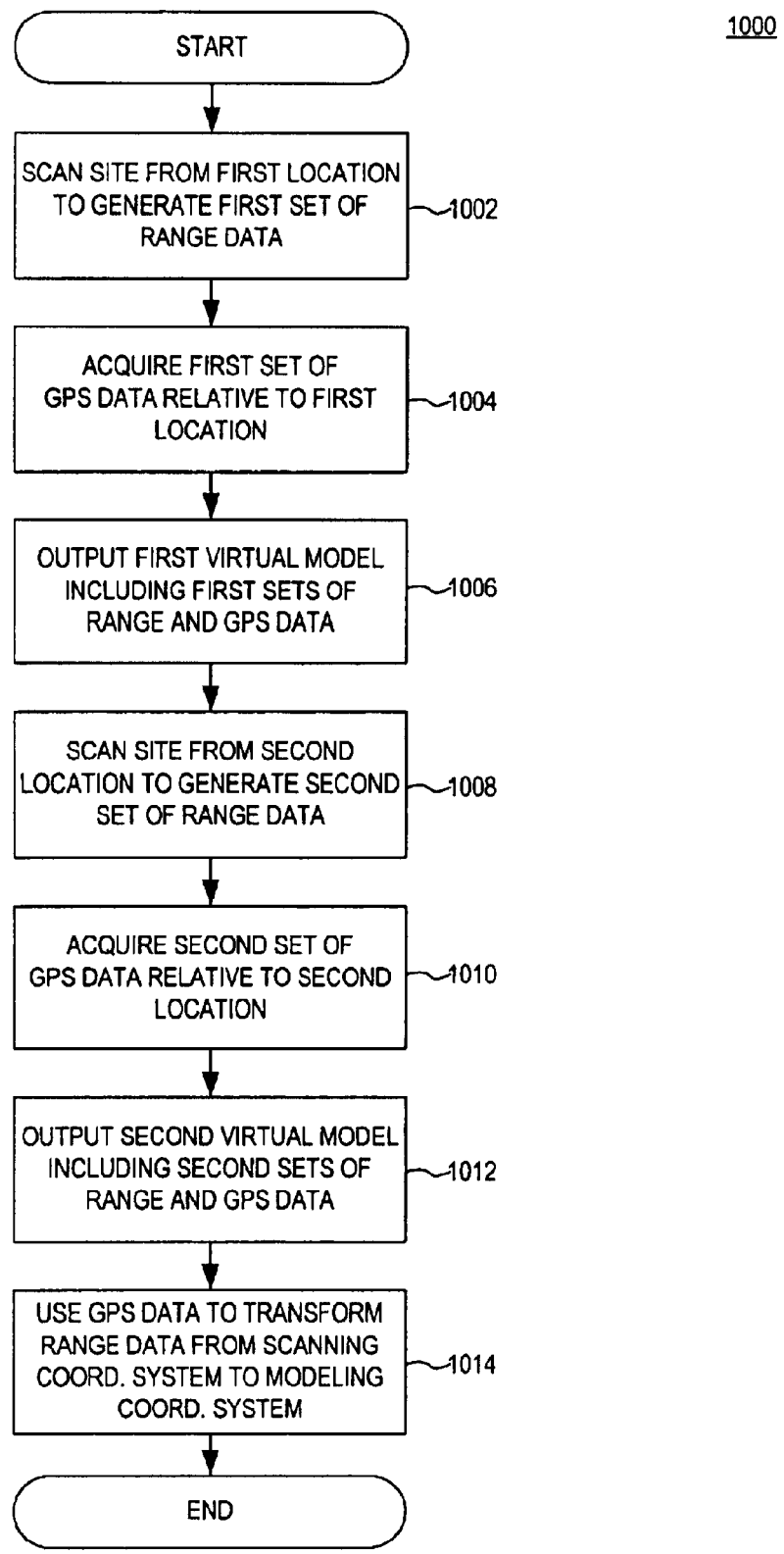
FIG. 10 is a flowchart of a method for capturing and co-registering virtual models of a site.

FIG. 10 is a flowchart of a method 1000 for capturing and co-registering virtual models 234 of a site 104. Initially, the site 104 is scanned 1002 to generate a first set of range data 302 indicating distances from a range scanner 102 at a first location to real-world objects in the site 104. A GPS receiver then acquires 1004 GPS data 304 relative to the range scanner 102 at the first location, after which the range scanner 102 outputs 1006 a first virtual model 234 comprising the first sets of range data 302 and GPS data 304.

After the range scanner 102 is moved to a second location, the method 1000 continues by scanning 1008 the site 104 to generate a second set of range data 302 indicating distances from the range scanner 102 at the second location to real-world objects in the site 104. In addition, the GPS receiver 116 acquires 1010 a second set of GPS data 304 relative to the range scanner 102 at the second location, after which the range scanner 102 outputs 1012 a second virtual model 234 comprising the second sets of range data 302 and GPS data 304.

In one configuration, a transformation module 229 then uses 1014 the sets of GPS data 304 to transform the sets of range data 302 from scanning coordinate systems 402 to a single modeling coordinate system 602. Thereafter, the transformed range data 302 can be merged and visualized using standard applications.

Figure 11:
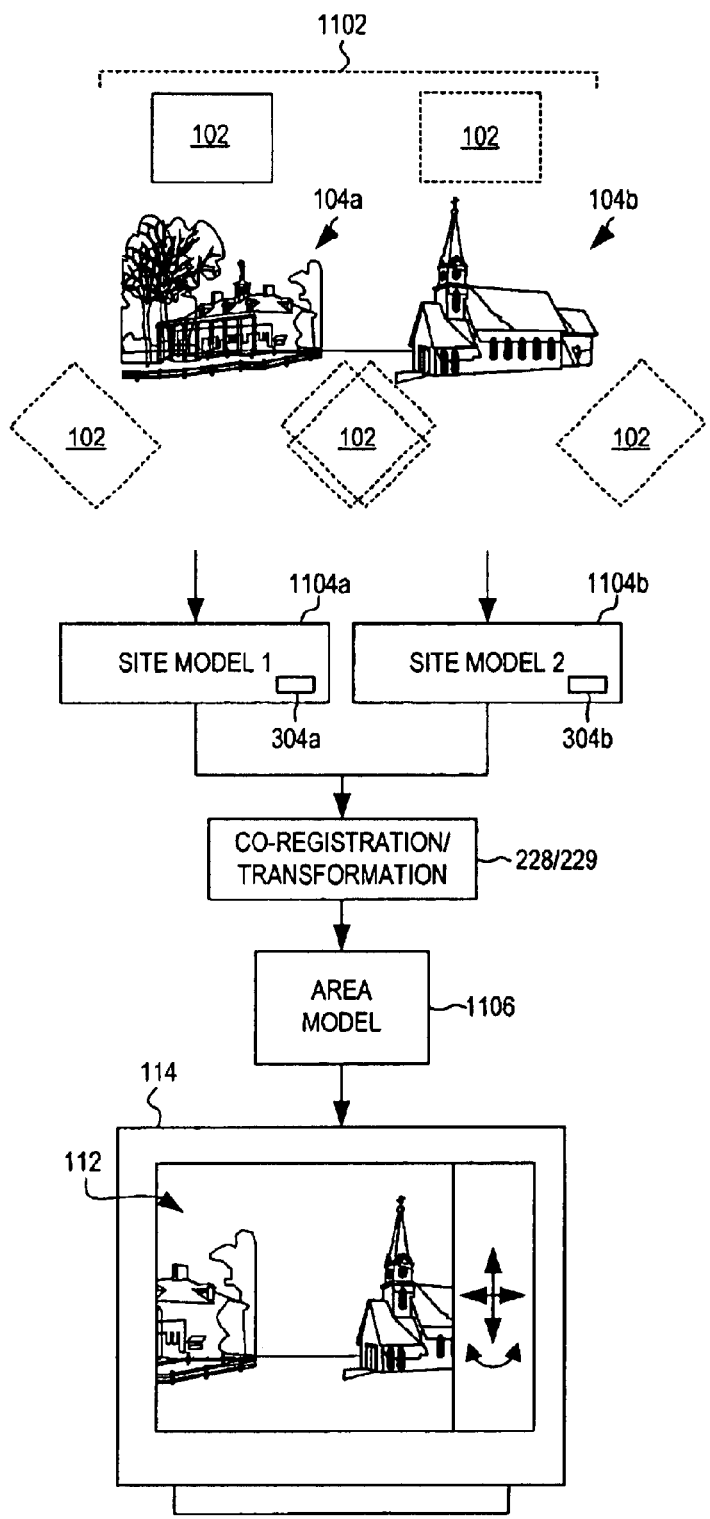
FIG. 11 is a schematic illustration of generating an area model based on scans of multiple sites.

As illustrated in FIG. 11, a range scanner 102 may be used to scan multiple sites 104a–b within a particular area 1102 to create multiple site models 1104a–b using the techniques discussed above. The sites 104a–b may or may not be contiguous, although they are typically in close proximity or related in some manner. For instance, the area 1102 may represents a town, campus, golf course, etc., while the sites 104a–b may correspond to different buildings or structures.

The site models 1104a–b may be co-registered models 702 or merged models 802, as previously shown and described. Furthermore, as previously noted, a site model 1104a–b may include GPS data 304.

In one embodiment, the transformation module 229 uses the sets of GPS data 304a–b to combine the individual site models 1104a–b into a single area model 1106. This may be done in the same manner as the virtual models 302a–c of FIG. 6 were transformed and combined into the co-registered model 702. Specifically, the GPS data 304 provides a common reference point for each site model 1104a–b, allowing the co-registration and/or transformation modules 228, 229 to make any necessary transformations.

The resulting area model 1106 may then be used to produce an interactive, three-dimensional visualization 112 of the entire area 1102 that may be used for many purposes. For example, a user may navigate from one site 104 to another within the area 1102. Also, when needed, a user may remove any of the site models 1104 from the area model 1106 to visualize the area 1102 without the objects from the removed site model 1104. This may be helpful in the context of architectural or land-use planning.

While specific embodiments and applications of the present invention have been illustrated and described, it is to be understood that the invention is not limited to the precise configuration and components disclosed herein. Various modifications, changes, and variations apparent to those skilled in the art may be made in the arrangement, operation, and details of the methods and systems of the present invention disclosed herein without departing from the spirit and scope of the invention.

What is claimed is:

1. A system for capturing a virtual model of a site including one or more occluded surfaces when viewed from any given perspective, the system comprising:

a range scanner for automatically scanning a site from a plurality of different fixed locations to generate a separate set of range data at each scanning location indicating distances from the range scanner to real-world objects within the site, each set of range data comprising a three-dimensional model of the same site from a different perspective, wherein at least one set of range data includes a surface of a real-world object that is occluded in at least one other set of range data;

a digital camera coupled to the range scanner for obtaining digital images of the real-world objects scanned by the range scanner at each location;

a global positioning system (GPS) receiver coupled to the range scanner for acquiring GPS data for the range scanner at a each scanning location, wherein the GPS receiver interacts with a separate base station to achieve sub-meter accuracy;

an orientation indicator coupled to the range scanner for indicating an orientation of the range scanner at each scanner location;

a transformation module for using the GPS data with orientation data for the range scanner at each scanning location to automatically transform the sets of range data from individual scanning coordinate systems based on the scanning locations to a single modeling coordinate system; and a co-registration module for automatically co-registering the transformed sets of range data into a single virtual model of the site that includes the one or more occluded surfaces.

2. The system of claim 1, further comprising:

a visualization module for converting the co-registered virtual model of the site into a polygon mesh and for applying textures to the polygon mesh derived from the digital imagery to create an visualization of the site that is substantially free of occlusions.

3. The system of claim 1, further comprising:

a merging module for merging at least two points represented within the co-registered virtual model that correspond to the same physical location within the site.

4. The system of claim 1, wherein the modeling coordinate system is a geographic coordinate system.

5. The system of claim 2, wherein the orientation indicator comprises a bearing indicator for indicating the bearing of the range scanner.

6. The system of claim 1, wherein the GPS data is selected from the group consisting of longitude, latitude, altitude, Universal Transverse Mercator (UTM) coordinates, and Earth-Centered/Earth-Fixed (ECEF) coordinates.

7. The system of claim 1, wherein at least two of the sets of range data indicate a distance from the range scanner to the same physical location within the site.

8. The system of claim 1, wherein the virtual model associates the digital images of the real-world objects with the corresponding range data.

9. The system of claim 1, wherein the range scanner comprises:

a servo for continuously changing an orientation of the range scanner with respect to a fixed location to scan the site; and a lidar to obtain range measurements to real-world objects along a changing path of the range scanner responsive to the servo.

10. A system for capturing a virtual model of a site including one or more occluded surfaces when viewed from any given perspective, the system comprising:

a range scanner for automatically scanning the site to generate a first set of range data indicating distances from the range scanner at a first location to real-world objects in the site, wherein the range scanner is to automatically re-scan the site to generate a second set of range data indicating distances from the range scanner at a second scanning location to real-world objects in the site, each set of range data comprising a three-dimensional model of the same site from a different perspective, wherein the second set of range data includes a surface of a real-world object that is occluded in the first set of range data;

a digital camera coupled to the range scanner for obtaining digital images of the real-world objects scanned by the range scanner at each location;

a global positioning system (GPS) receiver coupled to the range scanner for acquiring a first set of GPS data for the range scanner at the first scanning location and a second set of GPS data for the range scanner at the second location, wherein the GPS receiver interacts with a separate base station to achieve sub-meter accuracy;

an orientation indicator for indicating an orientation of the range scanner at each scanning location;

a transformation module for using the first and second sets of GPS data with orientation data for the range scanner at the scanning locations to automatically transform the first and second sets of range data from local coordinate systems referenced to the scanning locations to a single coordinate system independent of the scanning locations;

a co-registration module for automatically co-registering the first and second sets of range data into a single virtual model of the site that includes the one or more occluded surfaces; and a merging module for merging at least two points represented within the co-registered virtual model that correspond to the same physical location within the site.

11. The system of claim 10, further comprising:

a visualization module for converting the co-registered virtual model of the site into a polygon mesh and for applying textures to the polygon mesh derived from the digital imagery to create an visualization of the site that is substantially free of occlusions.

12. A system for modeling an object including one or more occluded surfaces when viewed from any vantage point, the system comprising:

a range scanner for automatically scanning an object from a plurality of fixed vantage points to generate a plurality of separate range images, each range image comprising a three-dimensional model the object from a different perspective, wherein at least one range image includes a surface of the object that is occluded in at least one other range image;

a digital camera coupled to the range scanner for obtaining digital images of the object from each vantage point;

a global positioning system (GPS) receiver for obtaining GPS readings for the range scanner at each vantage point, wherein the GPS receiver interacts with a separate base station to achieve sub-meter accuracy;

an bearing indicator coupled to the range scanner for indicating a bearing of the range scanner at each scanning location;

a transformation module for using the GPS readings associated with each range image, as well as information about the range scanner's bearing at each vantage point, to automatically transform the range images from local coordinate systems relative to the vantage points to a single coordinate system independent of the vantage points; and a co-registration module for automatically co-registering the transformed range images into a single virtual model of the object that includes the one or more occluded surfaces.

13. The system of claim 12, further comprising:

a visualization module for converting the co-registered virtual model of the object into a polygon mesh and for applying textures to the polygon mesh derived from the digital imagery to create an visualization of the object that is substantially free of occlusions.

14. The system of claim 12, wherein the range scanner comprises a servo for continuously changing an orientation of the range scanner with respect to a fixed location to scan the object; and a lidar to obtain range measurements the object along a changing path of the range scanner responsive to the servo.

15. The system of claim 12, wherein the virtual model is to associate the digital imagery and the corresponding range images within the virtual model.

16. The system of claim 12, further comprising:

a merging module for merging at least two points represented within the co-registered range images that correspond to the same physical location on the object.

17. A method for capturing a virtual model of a site including one or more occluded surfaces when viewed from any given perspective, the method comprising:

automatically scanning a site from a plurality of different fixed locations to generate a separate set of range data at each scanning location indicating distances from a range scanner to real-world objects within the site, each set of range data comprising a three-dimensional model of the same site from a different perspective, wherein at least one set of range data includes a surface of a real-world object that is occluded in at least one other set of range data;

obtaining digital images of the real-world objects scanned by the range scanner at each location;

acquiring global positioning system (GPS) data for the range scanner at each scanning location using a GPS receiver that interacts with a separate base station to achieve sub-meter accuracy;

obtaining orientation data for the scanner at each scanning location;

automatically transforming the separate sets of range data from individual scanning coordinate systems to a modeling coordinate system using the GPS data with the orientation data for the range scanner at each scanning location; and automatically co-registering the transformed sets of range data into a single virtual model of the site that includes the one or more occluded surfaces.

18. The method of claim 17, further comprising:

converting the co-registered virtual model of the site into a polygon mesh; and applying textures to the polygon mesh derived from the digital imagery to create an visualization of the site that is substantially free of occlusions.

19. The method of claim 17, further comprising:

merging at least two points represented within the co-registered virtual model that correspond to the same physical location within the site.

20. The method of claim 17, wherein the modeling coordinate system is a geographic coordinate system.

21. The method of claim 17, wherein the orientation information includes a bearing of the range scanner, the method further comprising:

determining the bearing of the range scanner.

22. The system of claim 17, wherein the GPS data is selected from the group consisting of longitude, latitude, altitude, Universal Transverse Mercator (UTM) coordinates, and Earth-Centered/Earth-Fixed (ECEF) coordinates.

23. The method of claim 17, wherein at least two of the sets of range data indicate a distance from the range scanner to the same physical location within the site.

24. The method of claim 17, further comprising:

associating the digital images of the real-world objects with the corresponding range data.

25. The method of claim 17, wherein scanning comprises:

continuously changing an orientation of the range scanner with respect to a fixed location to scan the site; and obtaining range measurements to real-world objects along a changing path of the range scanner.

26. A method for capturing a virtual model of a site including one or more occluded surfaces when viewed from any given perspective, the method comprising:

automatically scanning the site to generate a first set of range data indicating distances from a range scanner at a first location to real-world objects in the site, wherein the first set of range data comprises a three-dimensional model of the site from a first perspective;

obtaining digital images of the real-world objects scanned by the range scanner at the first location;

acquiring a first set of global positioning system (GPS) data for the range scanner at the first location using a GPS receiver that interacts with a base station to achieve sub-meter accuracy;

determining orientation information for the range scanner at the first location;

scanning the same site from a second perspective to generate a second set of range data indicating distances from the range scanner at a second location to real-world objects in the site, wherein the second set of range data comprises a three-dimensional model of the site from a second perspective, wherein the second set of range data includes a surface of a real-world object that is occluded in the first set of range data;

obtaining digital images of the real-world objects scanned by the range scanner at the second location;

acquiring a second set of GPS data for the range scanner at the second location;

determining orientation information for the range scanner at the second location;

automatically transforming the first and second sets of range data from individual local coordinate systems to a single coordinate system independent of the range scanner locations using the first and second sets of GPS data with the orientation information;

automatically co-registering the first and second sets of range data into a single virtual model of the site that includes the one or more occluded surfaces;

converting the co-registered virtual model of the site into a polygon mesh; and applying textures to the polygon mesh derived from the digital imagery to create an visualization of the site that is substantially free of occlusions.

27. A method for modeling an object including one or more occluded surfaces when viewed from any vantage point, the method comprising:

automatically scanning an object from a plurality of fixed vantage points to generate a plurality of separate range images, each range image comprising a three-dimensional model of the object from a different perspective, wherein at least one range image includes a surface of the object that is occluded in at least one other range image;

obtaining digital images of the object from each vantage point;

obtaining a bearing of the scanner at each vantage point;

acquiring global position system (GPS) readings for the range scanner at each vantage point using a GPS receiver that accesses a separate base station to achieve sub-meter accuracy;

transforming the range images from local coordinate systems relative to the vantage points to a single coordinate system independent of the vantage points using the GPS readings associated with each range image, as well as information about the range scanner's bearing at each vantage point; and automatically co-registering the transformed range images into a single virtual model of the object that includes the one or more occluded surfaces.

28. The method of claim, 27, further comprising:

converting the co-registered virtual model of the object into a polygon mesh; and applying textures to the polygon mesh derived from the digital imagery to create an visualization of the object that is substantially free of occlusions.

29. The system of claim 27, wherein scanning comprises:

continuously changing an orientation of the range scanner with respect to a fixed location to scan the object; and obtaining range measurements the object along a changing path of the range scanner responsive to the servo.

30. The system of claim 27, wherein the GPS data is selected from the group consisting of longitude, latitude, uniform, altitude, Universal Transverse Mercator (UTM) coordinates, and Earth-Centered/Earth-Fixed (ECEF) coordinates.

31. The method of claim 27, further comprising:

associating the digital imagery with the corresponding range images within the virtual model.

32. The method of claim 27, wherein at least two of the range images depict the same physical location within the site.

33. The system of claim 27, wherein the GPS data is selected from the group consisting of longitude, latitude, altitude, Universal Transverse Mercator (UTM) coordinates, and Earth-Centered/Earth-Fixed (ECEF) coordinates.

34. The system of claim 27, wherein at least two of the range images depict the same physical location on the object.

35. An apparatus for capturing a virtual model of a site including one or more occluded surfaces when viewed from any given perspective, the system comprising:

scanning means for automatically scanning a site from a plurality of different fixed locations to generate a separate set of range data at each scanning location indicating distances from the scanning means to real-world objects within the site, each set of range data comprising a three-dimensional model of the same site from a different perspective, wherein at least one set of range data includes a surface of a real-world object that is occluded in at least one other set of range data;

camera means coupled to the scanning means for obtaining digital images of the real-world objects scanned by the scanning means at each location;

position detection means coupled to the scanning means for acquiring global positioning system (GPS) data for the scanning means at a each scanning location, wherein the position detection means interacts with a separate base station to achieve sub-meter accuracy;

an orientation detection means coupled to the scanning means for indicating an orientation of the scanning means at each scanning location;

transformation means for using the GPS data with orientation data for the scanning means at each scanning location to automatically transform the sets of range data from individual scanning coordinate systems based on the scanning locations to a single modeling coordinate system; and co-registration means for automatically co-registering the transformed sets of range data into a single virtual model of the site that includes the one or more occluded surfaces.

36. A computer program product comprising program code for performing method for capturing a virtual model of a site including one or more occluded surfaces when viewed from any given perspective, the computer program product comprising:

program code for automatically scanning a site from a plurality of different fixed locations to generate a separate set of range data at each scanning location indicating distances from a range scanner to real-world objects within the site, each set of range data comprising a three-dimensional model of the same site from a different perspective, wherein at least one set of range data includes a surface of a real-world object that is occluded in at least one other set of range data;

program code for obtaining digital images of the real-world objects scanned by the range scanner at each location;

program code for acquiring global positioning system (GPS) data for the range scanner at each scanning location using a GPS receiver that interacts with a separate base station to achieve sub-meter accuracy;

program code for obtaining orientation data for the scanner at each scanning location;

program code for automatically transforming the separate sets of range data from individual scanning coordinate systems to a modeling coordinate system using the GPS data with the orientation data for the range scanner at each scanning location; and program code for automatically co-registering the transformed sets of range data into a single virtual model of the site that includes the one or more occluded surfaces.

* * * * *